United States Patent [19]

Moghe

[11] Patent Number: 5,114,290
[45] Date of Patent: May 19, 1992

[54] FIBER REINFORCED COMPOSITE THREADED MEMBER

[75] Inventor: Sharad R. Moghe, Northfield Center, Ohio

[73] Assignee: The B. F. Goodrich Company, Akron, Ohio

[21] Appl. No.: 285,482

[22] Filed: Dec. 16, 1988

[51] Int. Cl.$^5$ .................... F16B 35/04; B32B 31/00
[52] U.S. Cl. .................... 411/411; 411/424; 411/901; 411/908; 156/391; 156/393
[58] Field of Search ............ 411/411, 424, 366, 907, 411/908, 920, 901, 903, 904; 403/343; 405/259-261; 156/468, 475, 148, 149, 391-393

[56] References Cited

U.S. PATENT DOCUMENTS

| | | | |
|---|---|---|---|
| Re. 28,574 | 10/1975 | Ruoff | 425/78 |
| 2,915,110 | 12/1959 | Ferguson et al. | 156/393 |
| 3,394,527 | 7/1968 | McLean | 405/260 |
| 3,495,494 | 2/1970 | Scott . | |
| 3,579,402 | 5/1971 | Goldsworthy et al. | 156/392 |
| 4,326,905 | 4/1982 | Tanaka | 156/393 |
| 4,478,544 | 10/1984 | Strand | 411/34 |
| 4,522,529 | 6/1985 | Conley | 403/343 |
| 4,581,263 | 4/1986 | Lukas | 428/36 |
| 4,620,401 | 11/1986 | L'Esperance et al. | 52/309.15 |
| 4,623,290 | 11/1986 | Kikuzawa et al. | 411/908 |
| 4,659,268 | 4/1987 | Del Mundo et al. | 411/901 |
| 4,687,394 | 8/1987 | Berecz | 411/908 |
| 4,687,395 | 8/1987 | Berecz | 411/901 |
| 4,687,396 | 8/1987 | Berecz | 411/908 |
| 4,687,397 | 8/1987 | Berecz | 411/901 |
| 4,687,398 | 8/1987 | Berecz | 411/908 |
| 4,717,302 | 1/1988 | Adams et al. | 411/903 |

OTHER PUBLICATIONS

Report No. AFWAL-TR-87-3085 by John W. Herrick, Title-Fastener/Joining Method for Carbon-Carbon Structures Multidirectional Carbon-Carbon Fasteners, date—Jan. 5, 1988 (cited by Applicant in Paper #12).
Advertisement by Tiodize Co., p. 29, Advanced Composites Nov./Dec. 1988.
Tough Composites Advance Aerospace Race, Engineering News.

Primary Examiner—Neill R. Wilson
Attorney, Agent, or Firm—David M. Ronyak

[57] ABSTRACT

A threaded member including a core, a thread-defining element helically extending around and along the core and a reinforcing tubular fabric layer bonded to the exterior surface of the combined core and thread-defining element. The radial projection of the thread-defining element defines a helical thread whose contour is followed by the fabric layer and the exterior surface of the threaded member. The composite threaded member may be formed by forming a braided or knit fabric layer on an elongated spiral wrapped core. The spiral wrapped thread-defining element and the fabric reinforcing layer is bonded to the core. A polymer sheath protects the underlying structure.

48 Claims, 6 Drawing Sheets

TO FIG. 2B

FIBER REINFORCED COMPOSITE THREADED MEMBER

This invention relates to reinforced threaded plastic members such as bolts and nuts, and more particularly to threaded composite members which are reinforced with fibers extending in multiple directions (with at least some fibers extending generally in the direction of the thread and other fibers extending in a direction opposite to that of the thread) and to a method of making same.

BACKGROUND OF THE INVENTION

Fiber-reinforced polymeric resin composite materials are now widely used due to their outstanding strength to weight characteristics. These characteristics are especially important in the aircraft industry. Currently, structural components of these composite materials are joined to one another or to structural composites of the airframe employing other materials such as conventional metallic fasteners or adhesives. Conventional mechanical fasteners of metal are unsatisfactory for several reasons. They are subject to a weight penalty and susceptible to galvanic corrosion. Vibrations encountered during normal flight conditions and severe loading as experienced in storms or emergency maneuvers may result in failure of the fastener to composite structure joint. Adhesively bonded joints cannot be readily disassembled for service and maintenance.

While attempts to solve the aforestated deficiencies have been made using composite plastic fasteners, these earlier efforts have not been widely adopted due to economic or technical shortcomings.

For example, U.S. Pat. No. 3,495,494 to A. L. Scott discloses a threaded plastic member having a glass fiber reinforced thread in which a plurality of resin impregnated glass fiber reinforcing filaments are disposed in serpentine manner throughout the cross section of the thread and extending longitudinally of the axis of the threaded member. Manufacture of the threaded member requires a precision mold having a cavity complementary to that of the member to be formed.

U.S. Pat. No. 4,478,544 to Strand discloses a reinforced plastic rivet formed of carbon fibers encapsulated in an incompletely polymerized thermoset resin matrix. To use the rivet, its head portion is heated to soften the resin, the head is upset and fully polymerized. As with all rivets, this one is not threaded and it has further disadvantage of needing to be stored prior to use in a controlled low temperature environment to prevent premature setting of the resin.

It is evident from foregoing that a need remains for a threaded composite member that exhibits physical characteristics similar to modern composite materials such as those employed in aerospace applications and harsh chemical environments.

SUMMARY OF THE INVENTION

According to an aspect of the present invention, there is provided a threaded member comprising an elongate core, a thread-defining element helically extending around and along the lengthwise direction of the core and projecting radially outwardly of the core, and a reinforcing fabric layer enveloping, conforming and secured to the outer surface of the combined core and thread-defining element. There is no restriction on the type of fiber or matrix which may be employed in the construction. The core may be solid or hollow, fiber reinforced or not. The helical thread-defining element may contain a fibrous reinforcement or may be defined by bundle of filaments, a braided or twisted cord or polymeric matrix alone or in combination with one of the foregoing.

According to a further aspect of the present invention, there is provided a method for making a composite threaded member comprising:

providing an elongated core;

forming a helical element on the core which element projects of the core;

forming a reinforcing fabric layer enveloping and conforming to the combined core and helical element; and bonding the core helical element and reinforcing fabric layer to one another.

There is no restriction in the type of fiber or polymeric matrix which may be employed in the method. The core may be solid or hollow, fiber reinforced nor not. The helical element may be a bundle of filaments, a braided or twisted cord, polymeric matrix alone or containing any of the foregoing or short discrete fibers. The reinforcing fabric layer may be braided or knit. Heat and pressure may be applied subsequent to formation of the reinforcing fabric layer to effect consolidation of the fabric layer with the helical element and the core.

The above and other features and advantages of the invention will become more apparent from the following detailed description and appendant claims taken in conjunction with the accompanying drawings in which like reference numbers are used to refer to like parts, which together form a part of the specification.

DETAILED DESCRIPTION OF THE INVENTION

As used herein, the terms having, including, comprising and containing are synonymous. Unless otherwise specified at the point of use, all percentages, fractions and ratios in this specification, including the claims appended thereto, are on a weight basis. The term "rod" as used herein means a slender bar and may be hollow or solid. The term "pitch" and related forms as used herein means the distance from any point on the helical thread of a threaded member to the corresponding point on the adjacent thread formed by that same helical member measured parallel to the longitudinal axis of the threaded member. The term "helix angle" as used herein means the acute angle formed by the path of a thread-defining helical element and the lengthwise direction of the threaded member. A higher helix angle corresponds to a smaller pitch for threaded members of equal core diameter and thread-defining element radial projection. In the present specification and including its accompanying drawing, like numbers are used to refer to like features or members.

Figure 1A:
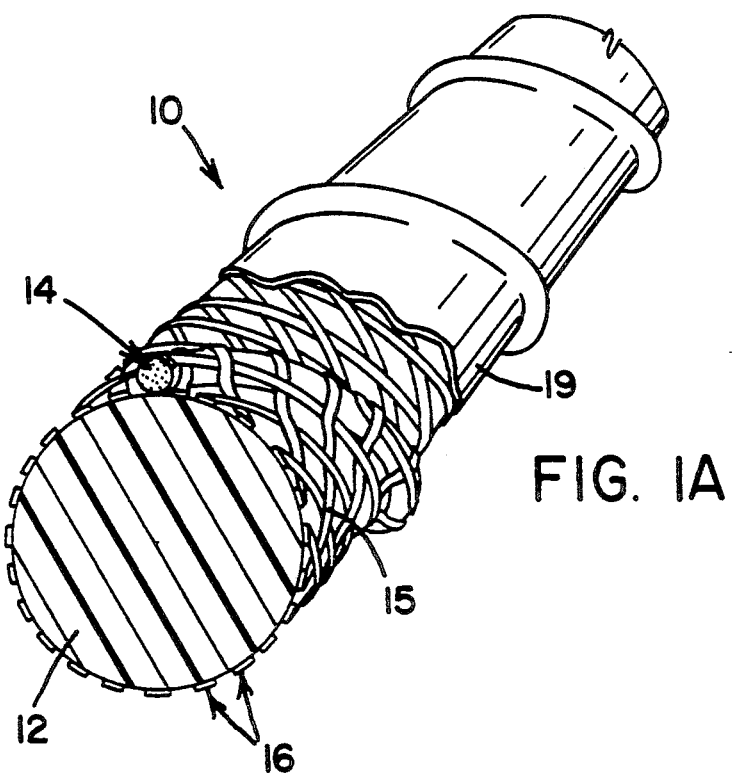
FIGS. 1A and 1B are respectively a prospective view and a side view with parts broken away of an embodiment of a threaded composite member made in accordance with the present invention.
Figure 1B:
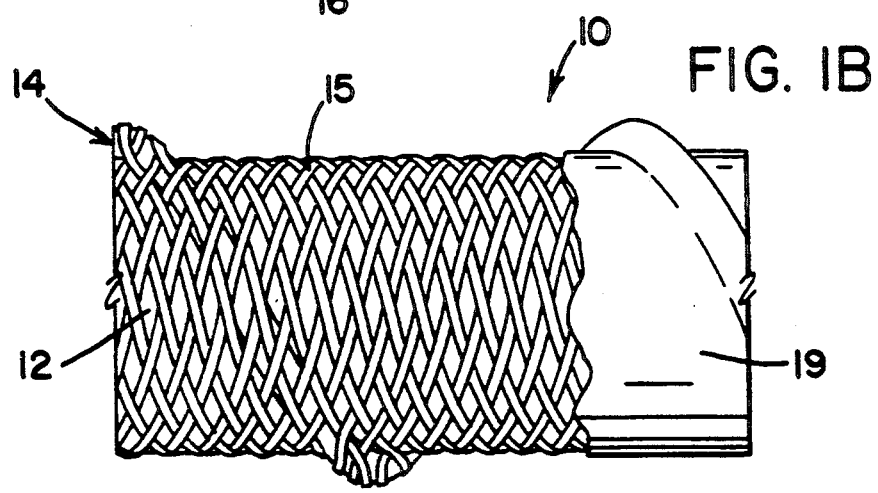

In FIGS. 1A and 1B, there is shown an embodiment of a threaded member 10 according to the present invention. Threaded member 10 includes an elongate core 12, a thread-defining element 14 which extends in helical fashion around and along the exterior cylindrical surface of core 12 and a reinforcing fabric layer such as braided layer 15 which envelops, conforms to and is bonded to the outer surface of the combined core 12 and thread-defining element 14. Thread-defining element 14 is of greater radial projection than that of the other non-thread-defining elements such as flat bundle brading elements 16, one of which is better shown in FIG. 4, which are formed into tubular braided fabric layer 15. Preferably the thread-defining element 14 is integral with or bonded to the core 12.

Figure 5:
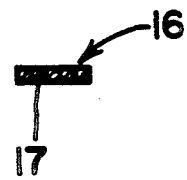
FIG. 5 is a cross-sectional view of an embodiment of a fabric forming element.

The core 12 is a rod and is preferably cylindrical although other cross-sectional configurations may be used such as hexagonal and those polygons having greater than six sides or oval. The core may be solid as illustrated in FIG. 1 by reference numeral 12 or hollow as illustrated in FIG. 5 by reference numeral 12''. Selection of the core is based primarily on intended end use. In low temperature and low stress applications, it is adequate to utilize a core formed of extruded thermoplastic such as, by way of example and without limitation, nylon. Where greater strength is desired or necessary, the polymer matrix may be filled with discontinuous or continuous fibers. Crystalline polymers are generally more resistant to creep than non-crystalline polymers. Where greatest strength and resistance to creep are desired, the core is preferably formed of a thermosettable polymeric matrix which is reinforced with continuous fibers which extend in the axial, that is, the lengthwise direction of the core. Suitable resins include, by way of example and without limitation, nylons (polyamides), polyesters, polyolefins, polyarylene sulfides (PPS), epoxies, polyimides, and the like. Suitable fibers include, by way of example and without limitation, glass, aramid, ceramic fibers and whiskers, and carbon fibers, and the like including combinations thereof. The fibers of the core should have a Young's modulus greater than that of the polymeric matrix in which they are embedded.

A particularly suitable core for applications where high modulus, strength and temperature are desired is a rod formed of glass fiber or carbon fiber in a polyphenylene sulfide matrix, which rods are available under the trademark Ryton ® PPS from Phillips Petroleum Company, Bartlesville, Okla.

The core may include a layer of braided or knit fabric or at least two layers of opposite sense helical fibrous reinforcements to render the core resistant to torsional loading or fibrous reinforcements which extend in lengthwise, that is, the axial direction of the core.

Thread-defining element 14, 14', 14'' may be formed of any suitable fiber including those listed above in regard to the cores 12 and 12''. Preferred are fibers of high Young's modulus such as those of aramid, glass and carbon. The fibers may be treated to enhance adhesion to the polymeric resin. Such treatment is not within the scope of the present invention but is well known to those skilled in the manufacture of fibers for reinforcement of composites.

Figure 4:
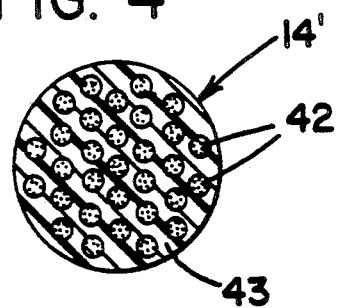
FIG. 4 is a cross-sectional view of an embodiment of a thread-defining element.
Figure 3:
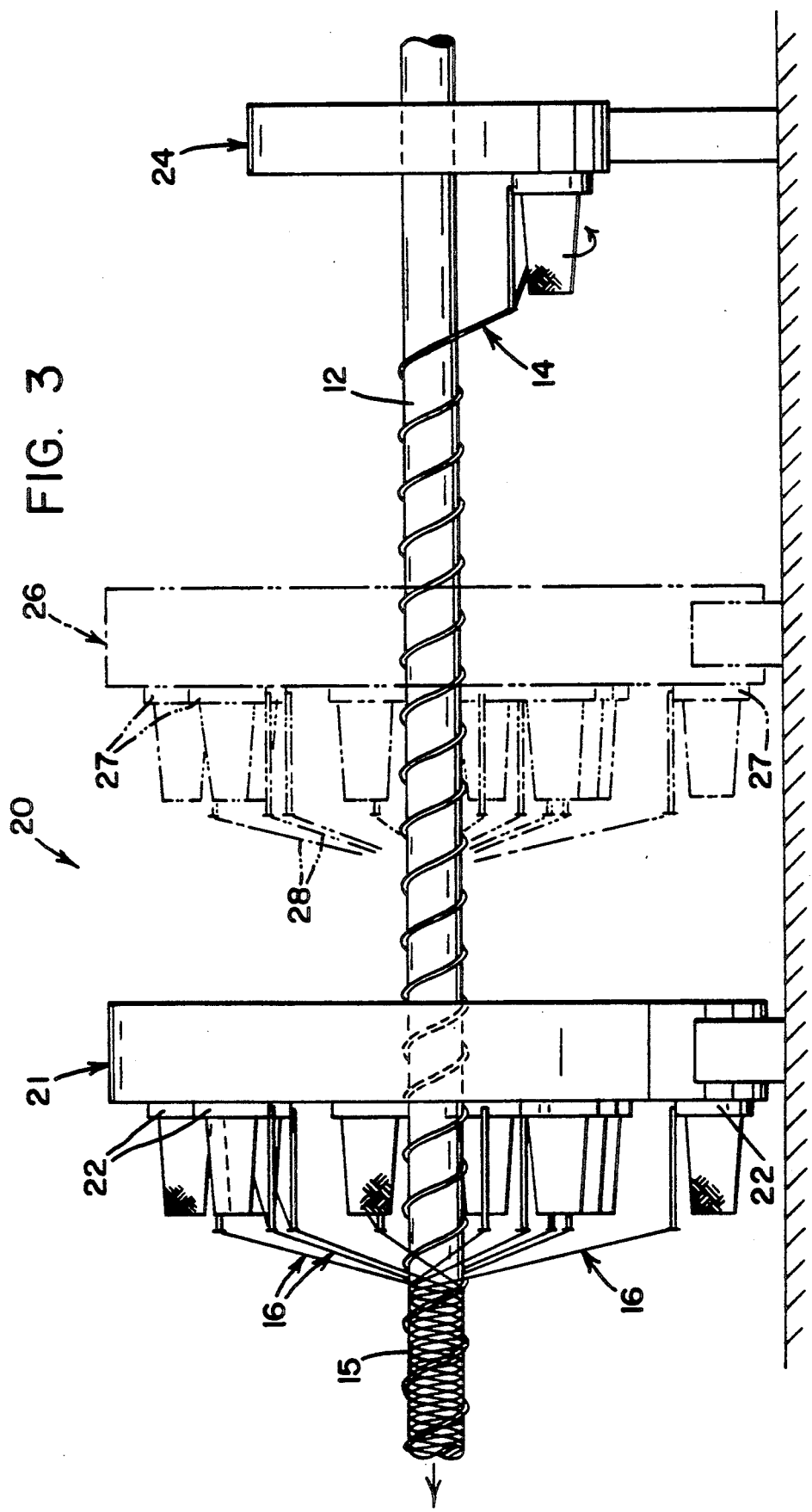
FIG. 3 is a side view partial schematic of manufacture of the threaded member of the present invention.

The thread-defining element 14 may be integrally formed with core 12 or may be helically applied to core 12 by a spiral wrapping machine 24 as shown in FIG. 3. Thread-defining element 12 may be polymer alone, fiber alone or a combination of polymer and fiber. Thread-defining element may be short fibers or continuous fibers in a polymer matrix. As shown in FIG. 4, the thread-defining element 14' may itself be formed of a plurality of sub-elements 42 such as filaments of generally rounded cross-sectional configuration. The filaments 42 may be encapsulated with polymeric matrix 43. The filaments 42 may be twisted together into a yarn. A plurality of yarns may be twisted into a cord. A plurality of cords may be twisted to form a larger thread-defining element. A plurality of bundles of filaments or a plurality of yarns or a plurality of cords may themselves be braided to form a thread-defining element. A strip of material may be twisted to form thread-defining element 14' or sub-element 42. The thread-defining element 14 should be resistant to deformation from its rounded cross-sectional configuration to ensure that element 14 projects radially outwardly from core 12 and influences the contour of the fabric layer formed thereover. In certain preferred embodiments element 14 is of circular cross-sectional configuration and resistant to deformation from such cross-sectional configuration as it is spirally wrapped onto core 12. In certain preferred embodiments this is achieved by forming element 14' of tightly compacted fibers and/or pre-impregnating the sub-elements 42 with a polymeric resin 43 to form a solid circular bundle.

As shown in FIG. 5, the flat bundle braiding elements 16 of braided fabric layer 15 are preferably of flattened cross-sectional configuration. These flat bundle elements 16 may be formed of any suitable fiber twisted or untwisted, formed into a plurality of sub-elements 17 such as yarns or cords which may be secured together in side-by-side relationship for example by braiding or by an adhesive polymer to form a flattened strip. The flat bundle elements 16 may be impregnated with polymeric resin prior to forming braided layer 14.

Figure 6:
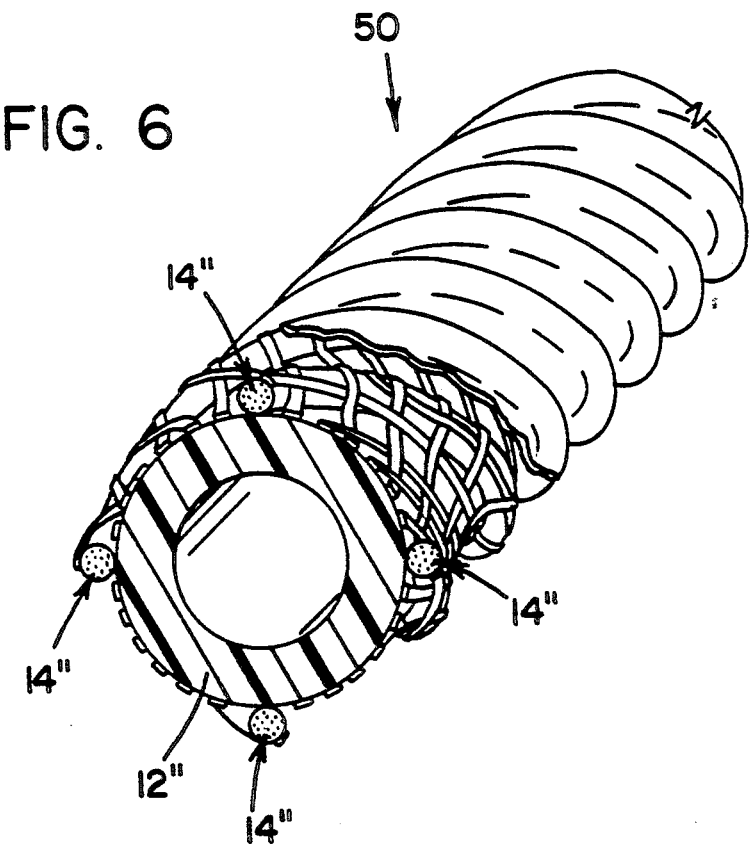
FIG. 6 is an isometric view with parts broken away of a further embodiment of a threaded member according to the present invention.

In FIG. 6, there is shown an alternate embodiment of a threaded member 50 according to the present invention. Threaded member 50 differs from that depicted in FIGS. 1A and 1B in that it includes a plurality of thread-defining elements 14'', each of which extends helically along hollow core 12''. Threaded member 50 retains a significant portion of its holding power in the event that one or more of its thread-defining elements 14'' are damaged or broken. While four thread-defining elements 14'' are illustrated, a greater or lesser number could be employed. Each of thread-defining elements 14'' is formed of short fibers in a polymer matrix.

Figure 7:
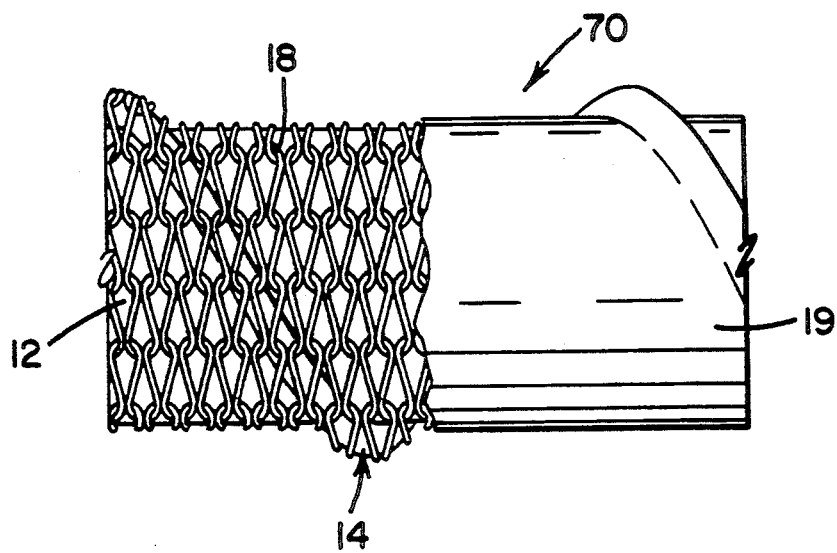
FIG. 7 is a side view with parts broken away of a further embodiment of a threaded composite member according to the present invention.

In FIG. 7, there is shown an alternate embodiment of a threaded member 70 according to the present invention. Threaded member 70 differs from that depicted in FIGS. 1A and 1B in that reinforcing fabric layer is in the form of knit layer 18 which envelopes, conforms to and is bonded to the outer surface of the combined core 12 and thread-defining element 14.

A portion of the manufacturing process for the certain embodiments of threaded members according to the present invention is illustrated in FIG. 3. Apparatus 20 contains in functional sequence a spiral wrap machine 24 and a fabric layer forming machine such as braider deck 21 shown in solid lines or knitting machine 26 shown in dashed lines. Braider deck 21 is conventional and includes a desired number of yarn or cord carriers 22. The number of carriers is not critical. The number of carriers needed for complete coverage of the surface of the core 12 increases with the size of the core in a manner well known to those skilled in the art of tubular braiding. For fasteners of up to about 1" (2.54 cm) diameter, commonly available 24 to 36 carrier single deck braiding machines may be employed to obtain full coverage of the core 12 with braided layer 14. Each of carriers 22 is fitted with a spool of continuous non-thread-defining element, such as flat bundle element 16 like those shown in FIGS. 1 and 4. As core member 12 is passed through apparatus 20, thread-defining helical element 14 is spirally wrapped onto the core 12 by spiral wrap machine 24 and thereafter a reinforcing fabric layer 15 is formed by braider deck 21 which braids the braiding elements 16 on to the spiral wrapped core. The thread-defining element 14 is bonded to the core 12 with polymeric resin. The thread-defining element 14 is also secured to core 12 by a plurality of non-thread-defining elements 16 which envelop the combined core 12 and helically extending thread-defining element 14 in the same and in opposite sense helical patterns from that of thread-defining element 14. Thread-defining element 14 is overlapped by non-thread-defining elements 16 of fabric layer 15. Fabric layer 15 closely conforms to and follows the outer surface contours of the combined core 12 and thread-defining helical element 14.

Still having reference to FIG. 3, there is shown in dashed lines an alternate means for forming a reinforcing layer which overlies and closely conforms to the spirally wrapped core. The combined core 12 and helical thread-defining element 14 may be passed through knitting machine 26 which forms a tubular knit reinforcing fabric from yarns 28 provided on carriers 27.

Figure 2A:
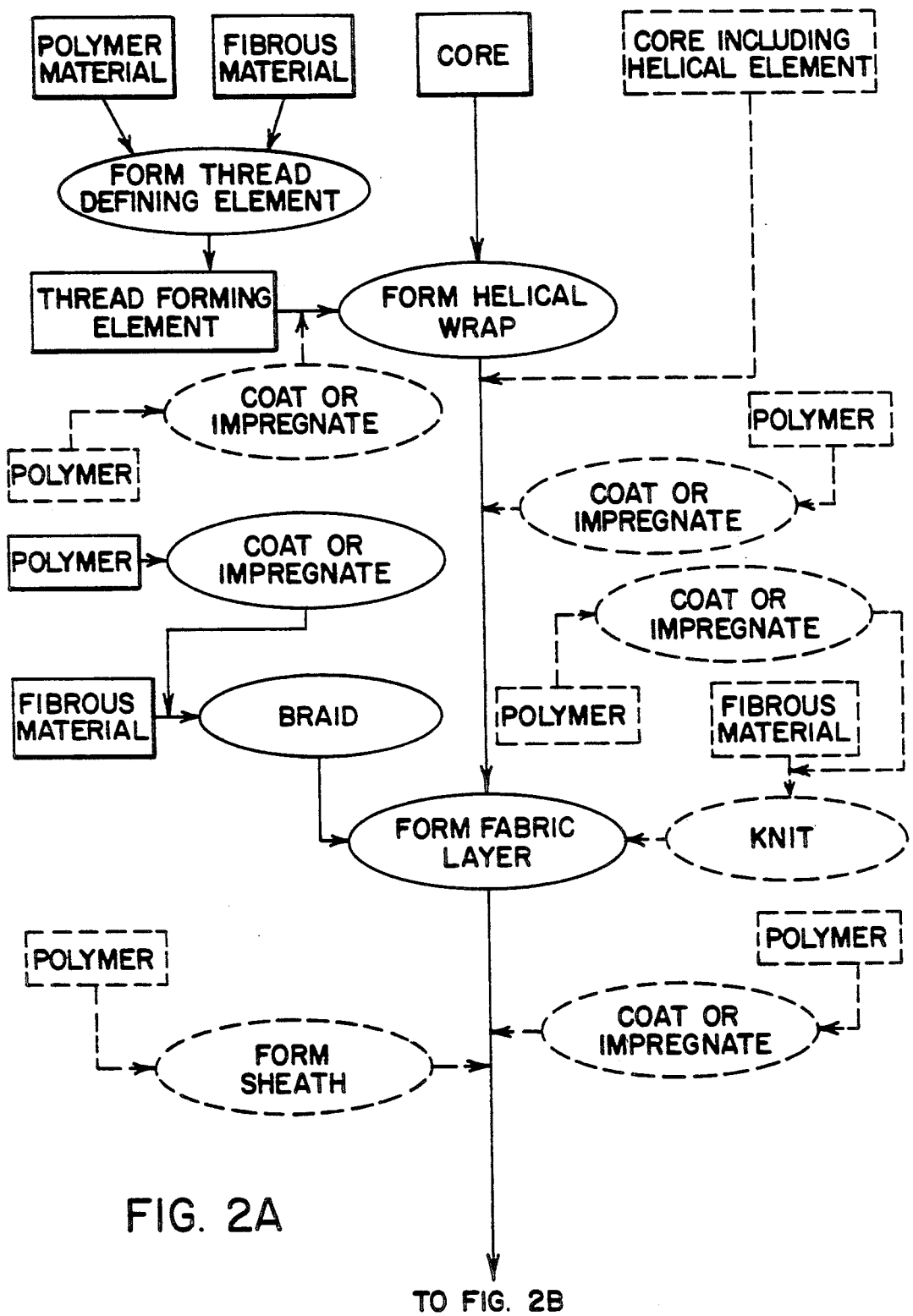
FIGS. 2A and 2B together form a flow chart depicting schematically in solid lines a preferred process and in dashed lines process variations and alternatives for the manufacture of certain embodiments of threaded composite members according to the present invention.
Figure 2B:
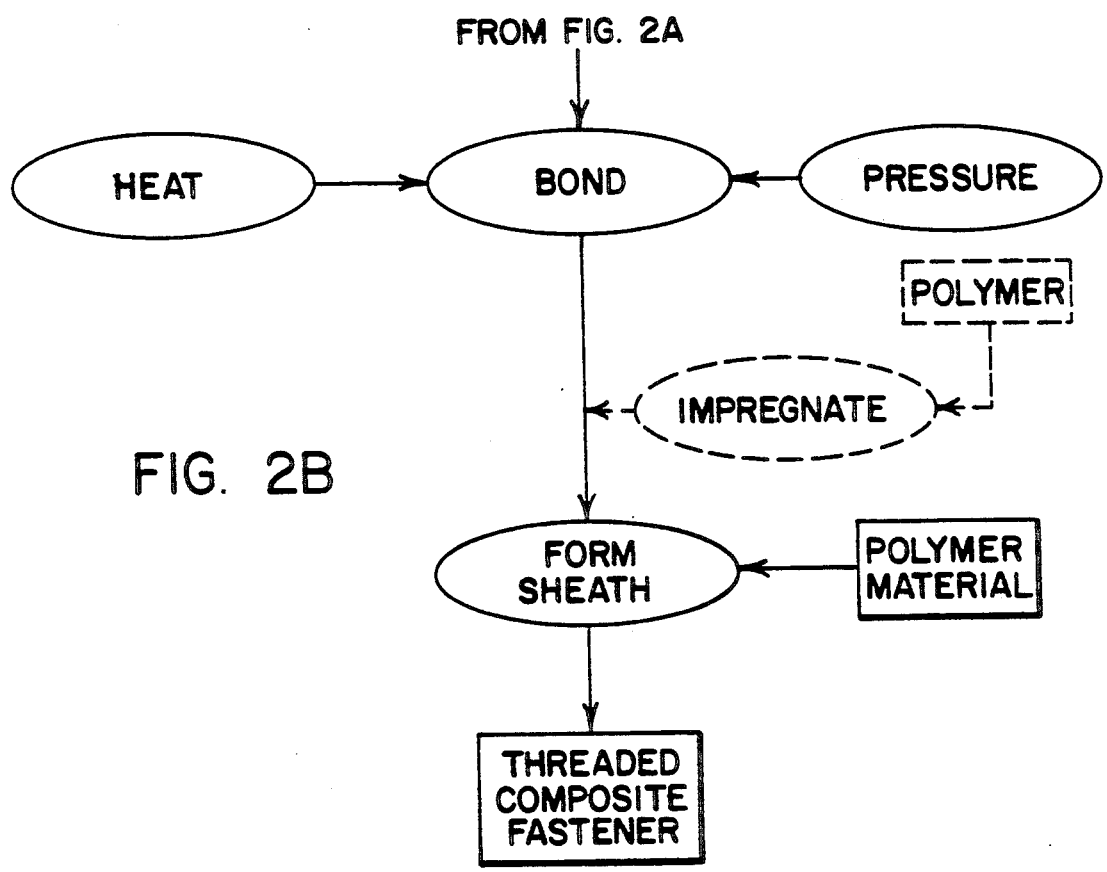

FIG. 2 schematically depicts processes for manufacture of composite threaded members according to the present invention. The core, as previously discussed, may or may not include a helical thread-defining element at the start of the process. If no helical thread-defining element is present on the core, one is applied for example and without limitation by spiral wrapping or extrusion. The thread-defining element may be formed of polymer material alone, fibrous material alone or a combination of polymer and fibrous materials. The thread-defining element may be polymer resin coated or impregnated prior to and/or subsequent to its application to the core.

The outer cylindrical surface of core may be coated with or formed of a thermoplastic or thermosettable polymer. The surface of the core may be heated to promote embedding and bonding of the helical thread-defining element and fabric layer to the core. A liquid bonding polymeric resin may be applied to the core prior to or subsequent to the core being passed through the spiral wrap machine and the fabric layer forming apparatus. Over the combined core and thread-defining helically extending element there is formed a layer of reinforcing fabric, preferably by braiding or knitting. Fibrous material used in forming the reinforcing fabric layer may be coated or impregnated with polymer prior to use to aid in bonding the fibrous material to the combined core and thread-defining element. The combined core, thread-defining element and fabric layer are secured to one another, preferably by chemical bonding.

Preferably the fibrous elements forming the reinforcing fabric layer are arranged in the tubular fabric layer such that the fabric layer is stable against rotation when a tensile load is applied in the lengthwise direction of the core. In other words, a torque is not generated which tends to rotate the core when a tensile load is so applied.

After the formation of the reinforcing fabric layer, the composite member may be consolidated by application of heat and pressure, for example, in an autoclave. This consolidation step forces the reinforcing fabric to more closely conform to the contours defined by the underlying combined core and thread-defining element. Preferably additional polymeric resin is applied subsequent to formation of the fabric layer to form a sheath which coats and protects the underlying structure layer against abrasion and to promote bonding of the braided layer to the core. Multiple applications of polymer resin may be employed to build up a protective sheath. A distinctly different resin selected primarily for its abrasion resistance may be applied subsequent to bonding of the reinforcing fabric layer.

Polymer resins which set by chemical action at room temperature without application of heat may be employed. The polymeric resins employed in the manufacture of the core, manufacture and impregnation of the thread-defining elements, the fibrous material used in forming the reinforcing fabric layer, and impregnating, bonding and coating of the fabric layer are selected so as to be compatible with one another.

Although the invention has been described with reference to its preferred embodiments, other embodiments can achieve similar results. Variations and modifications of the present invention will be obvious to those skilled in the art and it is intended to cover in the appended claims all such modifications and equivalents.

What is claimed is:

1. A threaded member comprising an elongate core, a thread-defining element containing fibrous reinforcement helically extending around and along the lengthwise direction of the core and projecting radially outwardly of the core, and a reinforcing fabric layer enveloping, conforming and secured to the outer surface of the combined core and thread-defining element, the reinforcing fabric layer having some fibers extending helically generally in the directional sense of the thread-defining element and other fibers extending helically in a directional sense opposite to that of the thread-defining element.

2. The threaded member of claim 1 wherein the core is a polymeric rod of circular cross-sectional configuration.

3. The threaded member of claim 1 wherein the core is a fiber reinforced polymeric rod.

4. The threaded member of claim 1 wherein the core comprises a plurality of substantially parallel continuous fibers extending in the longitudinal direction of the core and bound to one another by a polymeric matrix.

5. The threaded member of claim 1 wherein the helical element comprises a solid circular bundle of filaments.

6. The threaded member of claim 2 wherein the helical element comprises a solid circular bundle of filaments.

7. The threaded member of claim 3 wherein the helical element comprises a solid circular bundle of filaments.

8. The threaded member of claim 4 wherein the helical element comprises a solid circular bundle of filaments.

9. The threaded member of claim 1 wherein the helical element comprises one of a braided cord or twisted cord.

10. The threaded member of claim 2 wherein the helical element comprises one of a braided cord or twisted cord.

11. The threaded member of claim 3 wherein the helical element comprises one of a braided cord or twisted cord.

12. The threaded member of claim 4 wherein the helical element comprises one of a braided cord or twisted cord.

13. The threaded member of claim 1 wherein the helical element comprises polymeric matrix.

14. The threaded member of claim 2 wherein the helical element comprises polymeric matrix.

15. The threaded member of claim 3 wherein the helical element comprises polymeric matrix.

16. The threaded member of claim 4 wherein the helical element comprises polymeric matrix.

17. The threaded member of claim 1 wherein the helical element comprises short fibers extending in the direction of the helix embedded in the polymeric matrix.

18. The threaded member of claim 1 wherein the reinforcing fabric layer comprises a tubular braided layer.

19. The threaded member of claim 2 wherein the reinforcing fabric layer comprises a tubular braided layer.

20. The threaded member of claim 3 wherein the reinforcing fabric layer comprises a tubular braided layer.

21. The threaded member of claim 4 wherein the reinforcing fabric layer comprises a tubular braided layer.

22. The threaded member comprising an elongate core, a thread-defining element containing fibrous reinforcement, helically extending around and along the lengthwise direction of the core and projecting radially outwardly of the core, and a tubular knit reinforcing fabric layer enveloping, conforming and secured to the outer surface of the combined core and thread-defining element, the reinforcing fabric layer having portions of its fibers extending generally in the directional sense of the thread-defining element and other portions of its fibers extending in a directional sense different from that of the thread-defining element.

23. The threaded member of claim 22 wherein the core is a polymeric rod or circular cross-sectional configuration.

24. The threaded member of claim 22 wherein the core is fiber reinforced polymeric rod.

25. The threaded member of claim 22 wherein the core comprises a plurality of substantially parallel continuous fibers extending in the longitudinal direction of the core and bound to one another by a polymeric matrix.

26. The threaded member of claim 3 wherein the fibers of the core are non-metallic filaments.

27. The threaded member of claim 3 wherein the fibers of the core are selected from at least one of fiberglass, aramid or carbon filaments.

28. The threaded member of claim 3 wherein the fibers of the reinforcing fabric layer are non-metallic filaments.

29. The threaded member of claim 1 wherein the fibers of the reinforcing fabric layer are selected from at least one of fiberglass, aramid and carbon filaments.

30. The threaded member of claim 2 wherein the fibers of the reinforcing fabric layer are selected from at least one of fiberglass, aramid and carbon filaments.

31. The threaded member of claim 3 wherein the fibers of the reinforcing fabric layer are selected from at least one of fiberglass, aramid and carbon filaments.

32. The threaded member of claim 4 wherein the fibers of the reinforcing fabric layer are selected from at least one of fiberglass, aramid and carbon filaments.

33. The threaded member of claim 1 wherein at least two of the core, the helical element, and reinforcing fabric layer contain fibers which are of different chemical composition.

34. The threaded member of claim 3 wherein fibers of differing chemical composition are contained within at least one of the core, the helical element and the reinforcing envelope.

35. The threaded member of claim 1 wherein multiple thread-defining helical elements are present, each of the helical elements having the same helix angle but spaced apart from one another in the lengthwise direction of the threaded member.

36. The threaded member of claim 1 wherein the helical element comprises short fibers extending in the direction of the helix embedded in the polymeric matrix.

37. The threaded member of claim 1 further including a sheath of polymeric matrix.

38. A method of making a composite threaded member comprising:
   providing an elongate core;
   forming on the core a helical element which projects radially outwardly of the core;
   forming a reinforcing layer enveloping and conforming to the combined core and helical element, the fabric layer having some fibers extending generally in the direction of the helical element and other fibers extending in a direction different from that of the thread-defining element; and
   bonding the core, helical element and reinforcing fabric layer to one another.

39. The method of claim 38 further comprising forming the helical element with a fibrous reinforcement and spirally winding the helical element to the core.

40. The method of claim 38 further including impregnating the reinforcing fabric layer with a polymeric resin.

41. The method of claim 38 further including impregnating the polymeric resin and helical element and the members from which the reinforcing fabric layer is formed prior to formation of the reinforcing envelope.

42. The method of claim 38 further comprising applying head and/or pressure subsequent to formation of the reinforcing fabric layer to effect consolidation of the fabric layer with the helical element and core.

43. The method of claim 38 wherein the elongate core is a fiber reinforced polymeric rod.

44. The method of claim 38 wherein the reinforcing fabric layer is selected from knit and braided layers.

45. The method of claim 38 wherein the helical element contains fibrous reinforcement.

46. The method of claim 38 further comprising applying head and pressure after forming a reinforcing fabric layer.

47. The method of claim 38 further comprising the step of covering the combined core, helical element and reinforcing fabric layer with a sheath of polymeric matrix.

48. The method of claim 38, wherein the reinforcing fabric layer has some fibers extending helically generally in the directional sense of the thread-defining element and other fibers extending helically in a directional sense opposite to that of the thread-defining element.

* * * * *